United States Patent
Rodriguez et al.

(10) Patent No.: US 6,980,564 B1
(45) Date of Patent: Dec. 27, 2005

(54) MODULAR DATA COMMUNICATION EQUIPMENT SYSTEM

(75) Inventors: Juan O. Rodriguez, Alpharetta, GA (US); David J. Berman, Swampscott, MA (US); James D. Lakin, Roswell, GA (US)

(73) Assignee: Nortel Networks Limited, St. Laurent (CA)

( * ) Notice: Subject to any disclaimer, the term of this patent is extended or adjusted under 35 U.S.C. 154(b) by 811 days.

(21) Appl. No.: 09/884,684

(22) Filed: Jun. 19, 2001

Related U.S. Application Data

(63) Continuation of application No. 09/753,014, filed on Jan. 2, 2001, now abandoned.

(51) Int. Cl.⁷ .............................................. H04J 3/16
(52) U.S. Cl. ...................................... 370/466; 370/419
(58) Field of Search ............................... 370/419, 420, 370/421, 466, 467, 400, 401; 709/249

(56) References Cited

U.S. PATENT DOCUMENTS 5,251,207 A * 10/1993 Abensour et al. ........... 370/473
5,550,984 A * 8/1996 Gelb ......................... 709/245
6,026,086 A * 2/2000 Lancelot et al. ............. 370/353

* cited by examiner

Primary Examiner—Bob A. Phunkulh
(74) Attorney, Agent, or Firm—Withrow & Terranova, PLLC

(57) ABSTRACT

A network interface unit includes an interface module for translating messages transmitted between one of a family of different types of service delivery units. Each type of service delivery unit provides a network service that is different than the network service provided by the other types of service delivery units in the family. The service delivery unit connected to the network interface unit processes messages received in a first format. The network interface unit thus includes a medium module configured to process data for transmission between the given medium and the service delivery unit, and the interface module. The medium module transmits messages toward the service delivery unit in a second format. The interface module is configured to receive messages transmitted between the medium module and the service delivery unit. The interface module is configured to translate messages from the second format to the first format.

27 Claims, 6 Drawing Sheets

MODULAR DATA COMMUNICATION EQUIPMENT SYSTEM

PRIORITY

This application is a continuation of and claims priority from U.S. patent application Ser. No. 09/753,014, filed Jan. 2, 2001, now abandoned, and entitled, "MODULAR DATA COMMUNICATION EQUIPMENT SYSTEM." The disclosure of that application is incorporated herein, in its entirety, by reference.

FIELD OF THE INVENTION

The invention relates generally to data transmission networks and, more particularly, the invention relates to data communication equipment for use by data termination equipment.

BACKGROUND OF THE INVENTION

Different network services, such as cable television and telephone services, traditionally have been developed for use over different types of networks. For example, telephone services traditionally has been developed around the public switched telephone network (the "PSTN"), while cable television services traditionally have been developed around the cable television network.

To provide a network service, a network access device (commonly known as "Data Communications Equipment" or "DCE") commonly is used to connect a network device (e.g., a telephone or television) to the network. More particularly, the DCE provides network devices known as "Data Termination Equipment" ("DTE") with access to their underlying network. For additional information relating to DCEs and DTEs, see the family of standards relating to recommended standard-232 (often referred to as "RS-232"), which is a widely used standard interface approved by the Electronic Industries Alliance ("EIA") for connecting serial devices.

The above noted interrelationship between service and network type has caused the network service industry to develop network access equipment (DCEs) that provides a specific service over its corresponding traditional network only. Continuing with the above example, the provision of cable television services commonly requires use of a cable conversion box ("cable box," which is a type of DCE) that provides the direct connection to the cable network. In a manner similar to DCEs for other types of networks/services, the cable box typically includes medium interface circuitry for conforming data transmissions with the specifications required by cable networks (e.g., the well known DOCSIS standards, discussed herein), and service delivery circuitry that provides the higher level television services to a connected television (i.e., functions perceived by the user of the DTE). Among other functions, such service delivery circuitry may provide access to a selected set of television stations (e.g., based upon a user's subscription to a cable company), and channel mapping functionality that maps a cable channel to a channel on the attached television.

In recent years, however, the trend has been to provide a single service via any one of numerous different types of networks. For example, telephone services currently can be delivered via the circuit switched technology in the PSTN, or via a broadband network, such as a cable network or fiber optic network. Accordingly, a single DCE for use with the telephone services must be produced for use with each network/medium type. For example, a separate telephony DCE must be developed for use with each of cable networks, fiber optic networks, wireless networks, etc . . . . With the proliferation of network services and broadband types/uses, this requires a rather wide variety of DCEs for each service, and for each network type. Although currently necessary, this duplication is inefficient, and causes relatively high deployment costs for various network services and network types.

SUMMARY OF THE INVENTION

In accordance with one aspect of the invention, a network interface unit includes an interface module for translating messages transmitted between one of a family of different types of service delivery units. Each type of service delivery unit provides a network service that is different than the network service provided by the other types of service delivery units in the family. The service delivery unit connected to the network interface unit processes messages received in a first format. The network interface unit thus includes a medium module configured to process data for transmission between the given medium and the service delivery unit, and the interface module. The medium module transmits messages toward the service delivery unit in a second format. The interface module is configured to receive messages transmitted between the medium module and the service delivery unit. The interface module is configured to translate messages from the second format to the first format.

In some embodiments, the service delivery unit transmits messages in the first format, and the medium module processes messages received in the second format. Accordingly, the interface module also is configured for translating messages from the first format to the second format.

All the different types of service delivery units in the family may process data in the first format, or only one type of service delivery unity may process data in the first format. In the latter case, the other types of service delivery units in the family process data in different formats. The given medium may be a broadband medium, such as fiber optic technology, cable technology, or digital subscriber line technology. The network service may include at least one of telephony, data service, audio service, video service, and Virtual Private Network service.

The network unit interface also may include a connector for electrically and physically connecting to the service delivery unit. The connector is a single size that corresponds to the size of connectors on each of the types of service delivery units in the family. Among other things, the medium module includes a network physical layer and media control module. The network interface unit preferably is physically separated from the service delivery unit. The service delivery unit and network interface unit cooperate to act as data communication equipment for data terminal equipment.

In accordance with another aspect of the invention, a service delivery unit for providing a network service cooperates with a network interface unit to function as data termination equipment. The network interface unit is one type of a plurality of different types of network interface units. Each type of network interface unit has connection logic for connecting to a network medium that is different than the network mediums to which the other types of network interface units can connect. The network interface unit processes messages in a first format. The service delivery unit thus includes a network service module that provides the network service, and an interface module for intercepting and translating messages transmitted between the network service module and the network interface unit. The network service module transmits messages toward the network interface unit in a second format. The interface module is configured to translate messages from the second format to the first format.

In accordance with other aspects of the invention, a modular data communication equipment system includes a family of different types of network interface units, a family of different types of service delivery units, and an interface configured to convert the format of messages transmitted between any one type of the network interface units and any one type of the service delivery units. Each type of network interface unit has connection logic for connecting to a network medium that is different than the connection media to which the other types of network interface units can connect. In a similar manner, each type of service delivery unit provides a network service that is different than the service provided by the other types of service delivery units. The network interface units are configured to communicate with at least one service delivery unit via formatted messages that, as noted above, are converted by the interface.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a network access system includes a family of different types of network interface units that each can cooperate with any one type of a family of different types of service delivery units to act as data communication equipment ("DCE"). To that end, each type of network interface unit and service delivery unit is both modular and functionally independent. Accordingly, any type of network interface unit preferably can physically and electrically connect with any type of service delivery unit to provide complete DCE functionality. The disclosed network access system thus is configured to permit commonly used data terminal equipment (e.g., an Internet telephone) to execute various network services over various network types. Details and illustrative examples are discussed below.

Figure 1:
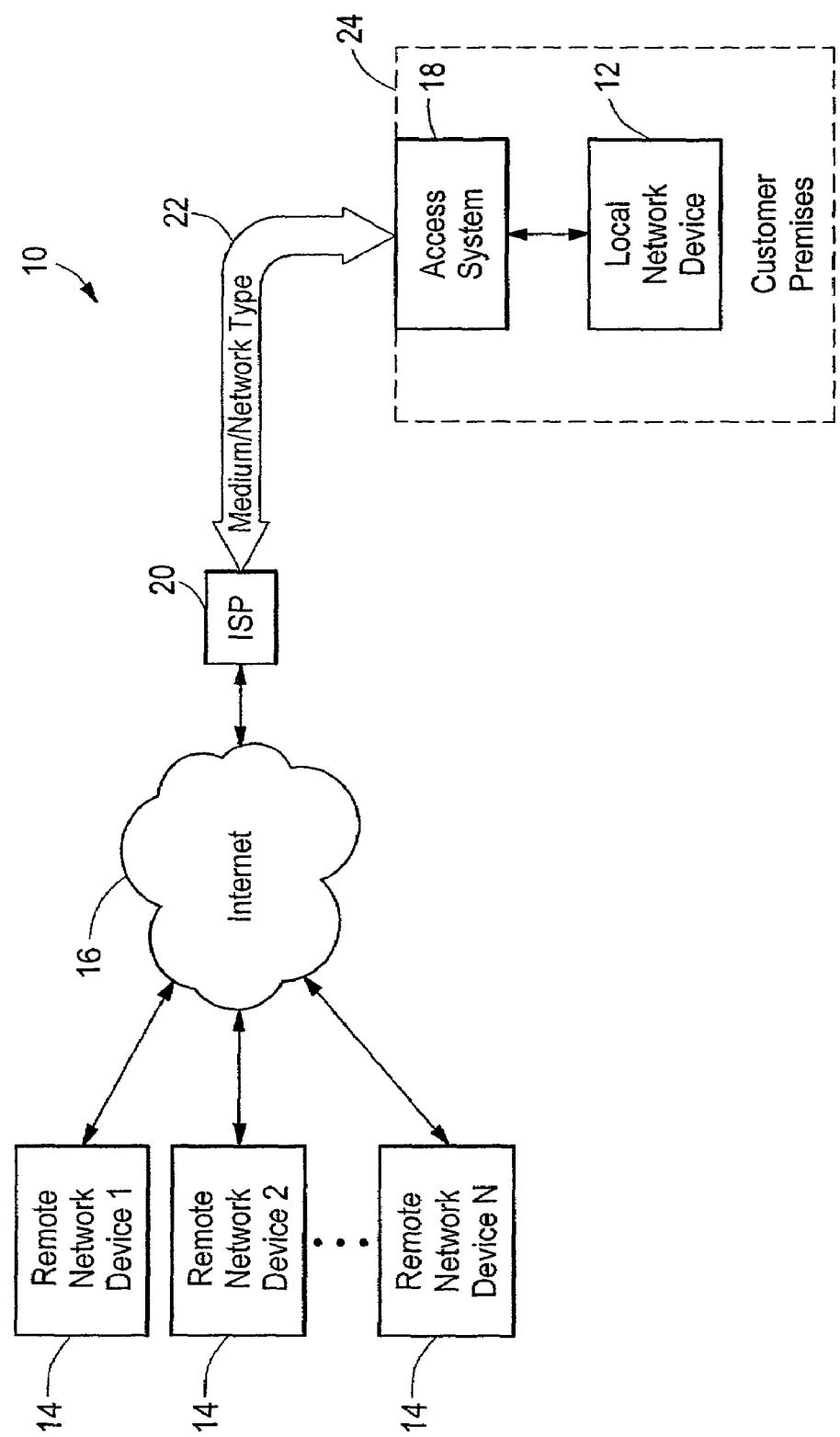
FIG. 1 schematically shows an exemplary network that may be used in connection with illustrative embodiments of the invention.

FIG. 1 schematically shows an exemplary network 10 that may be used in connection with illustrative embodiments of the invention. The network 10 includes a local network device 12 that communicates with one or more of a plurality of different remote network devices 14 via the Internet 16. Among other things, the local network device 12 may be a computer system, IP telephone, or network appliance. To connect to the Internet 16, the local network device 12 uses a network access system 18 (noted above and discussed in detail below) to connect to an Internet Service Provider ("ISP 20") via some network medium 22 (also referred to herein as "network type 22"). The local network device 12 and access system 18 are shown as being located at a customer's premises, such as in a single office.

The network medium 22 can be any known medium currently used in the art. Among other types, the network medium 22 may be a conventional twisted pair (e.g., telephone lines used for a Digital Subscriber Line), cable lines, fiber optic lines, a wireless medium (e.g., Bluetooth), or some combination thereof. As known in the art, data transmissions across each type of network medium 22 must comply with a standard protocol. For example, if the network medium 22 is a cable network, then transmission across the medium 22 must comply with some accepted cable network data transmission standard, such as the "Data Over Data-Over-Cable Service Interface Specification." For additional information relating to this standard, see "Data-Over-Cable Service Interface Specifications, Radio Frequency Interface Specification," which is a cooperative effort under the direction of Cable Television Laboratories, Inc., with a copyright of 1999 and 2000 and document control number SP-RF1v1.1-104-000407, the disclosure of which is incorporated herein, in its entirety, by reference. This specification is commonly referred to in the art by the acronym "DOCSIS."

Although the network medium 22 is shown schematically as a single element, it may include two or more separate and distinct types of network media 22. For example, the network medium 22 may include a cable network and a separate fiber optic network. In such case, the access system 18 provides access to both types of networks.

Figure 2:
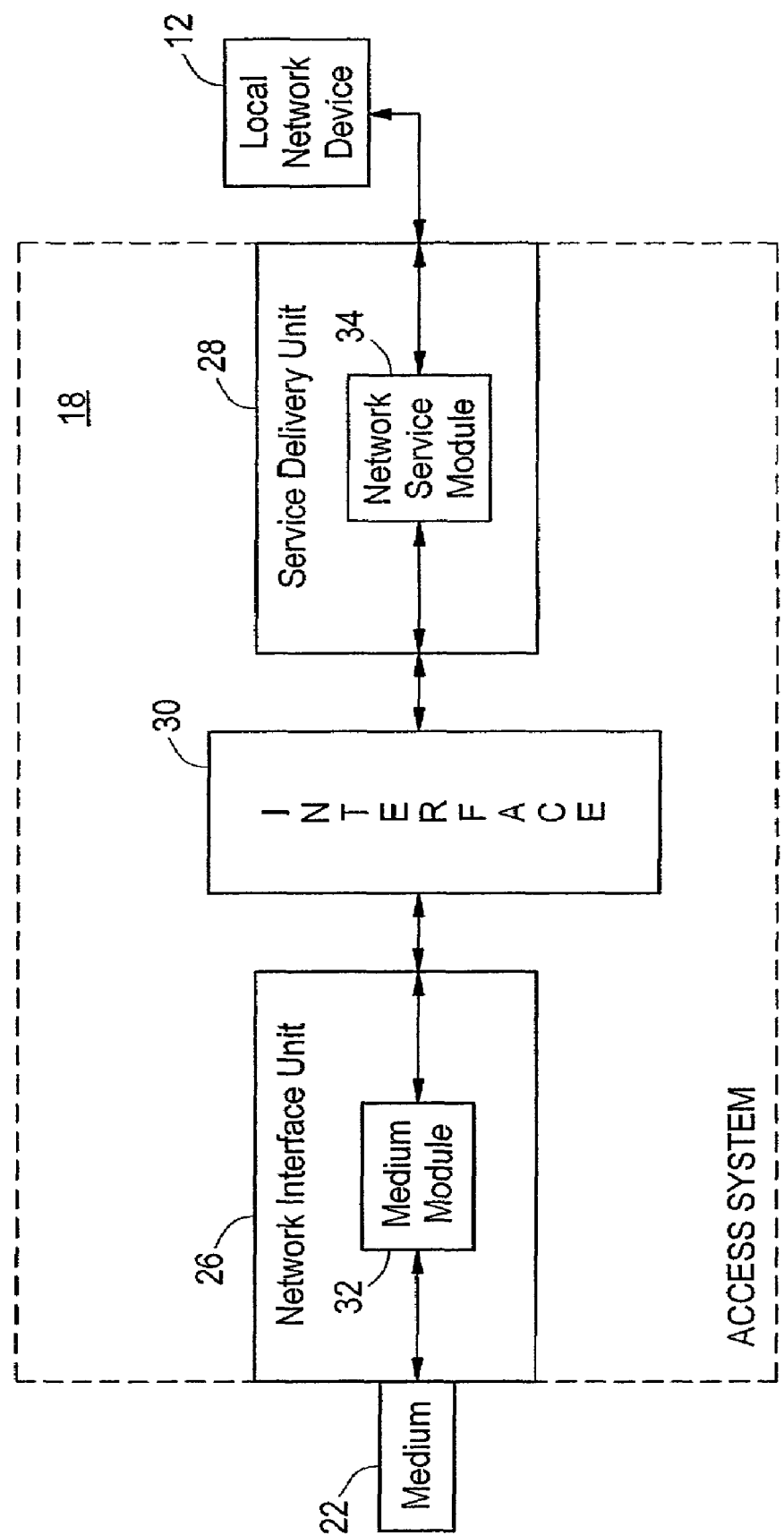
FIG. 2 schematically shows a modular network access system configured in accordance with illustrative embodiments of the invention.

FIG. 2 schematically shows additional details of the access system 18 shown in FIG. 1. Specifically, the access system 18 includes one unit of a family of different types of improved network interface units 26 that provide the necessary physical layer conversions and/or signal processing for transmission across a given network medium 22, and one unit of a family of different types of service delivery units 28 that provide the necessary logic for permitting a given network service to be performed by the network device 12. In addition, the access system 18 also includes a standard interface 30 for logically connecting the network interface unit 26 with the service delivery unit 28. Details of these three different components of the access system 18 are discussed below. It should be noted that in some embodiments, the network interface units 26 may be referred to as network interface modules. In still other embodiments, the service delivery units 28 may be referred to as service delivery modules.

In particular, the network interface unit 26 includes a medium module 32 having hardware and software for implementing the appropriate physical layer and medium control processes required for transmitting data messages across the given network type 22. Stated another way, the medium module 32 implements the underlying specification for transmitting data across the network medium 22 to which it is attached. This functionality is independent of the service being provided by the service delivery unit 28. The medium module 32 may include a single element, or a plurality of different devices/modules for implementing the required function. By way of example, if the network medium 22 is a cable network, then the medium module 32 may include the hardware and software for implementing the DOCSIS standard (see FIG. 7, discussed below).

Of course, since the network interface unit 26 is but one type in a family of different types of network interface units 26, then a different type of network interface unit 26 may be constructed for each of various different network types 22. Accordingly, network interface units 26 can be constructed for use with cable networks, twisted pair networks implementing a digital subscriber line ("DSL"), fiber optic networks, and wireless networks, among others. The appropriate network interface unit 26 then is selected for use in the access system 18 based upon the network type 22 to which it is connected. In some embodiments (discussed below), multiple network interface units 26 can be used in conjunction with one or more service delivery units 28 within a single access system 18.

The service delivery unit 28 includes a network service module 34 for permitting the local network device 12 to execute a network service via the access system 18. As discussed in greater detail by example in FIG. 7, the network service module 34 includes hardware and/or software to process specific messages for implementing a given network service across some network. Of course, the network service module 34 provides the given service independently of the type of network medium 22 to which the access system 18 is connected. As noted above, examples of the network service module 34 and the service delivery units 28 are discussed below with reference to FIG. 7.

Each different type of network interface unit 26 may process data in a different format than the formats used by other types of network interface units 26. More particularly, a network interface unit 26 for use with a first network type 22 may receive and transmit messages within the access system 18 in a different format than a network interface unit 26 that is configured for use with a different network type 22. In a similar manner, each different type of service delivery unit 28 may process data in a different format than the formats used by other types of service delivery units 28. The interface 30 thus converts messages transmitted between the service delivery unit 28 and the network interface unit 26 into an appropriate format that is understandable to the receiving network interface unit 26 or service delivery unit 28.

Figure 3:
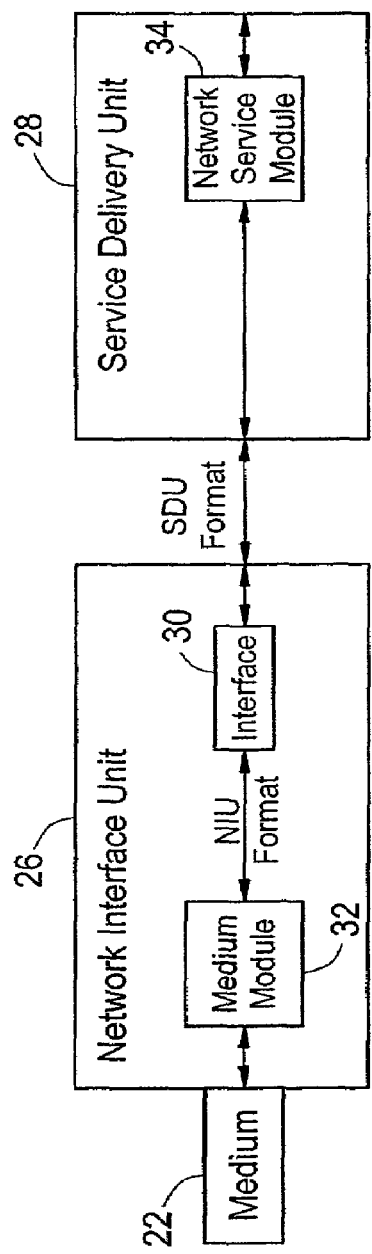
FIG. 3 schematically shows the modular network access system shown in FIG. 2 in which an interface is located solely on a network interface unit.
Figure 4:
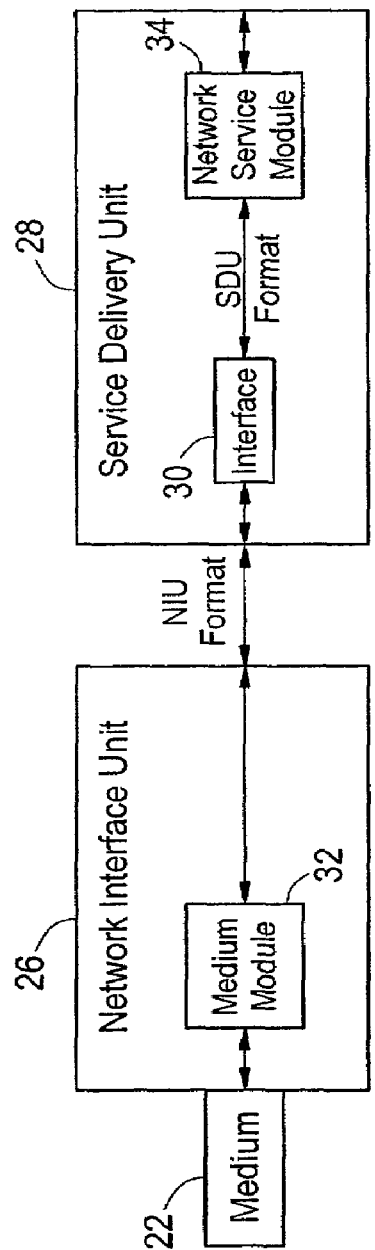
FIG. 4 schematically shows the modular network access system shown in FIG. 2 in which an interface is located solely on a service delivery unit.
Figure 5:
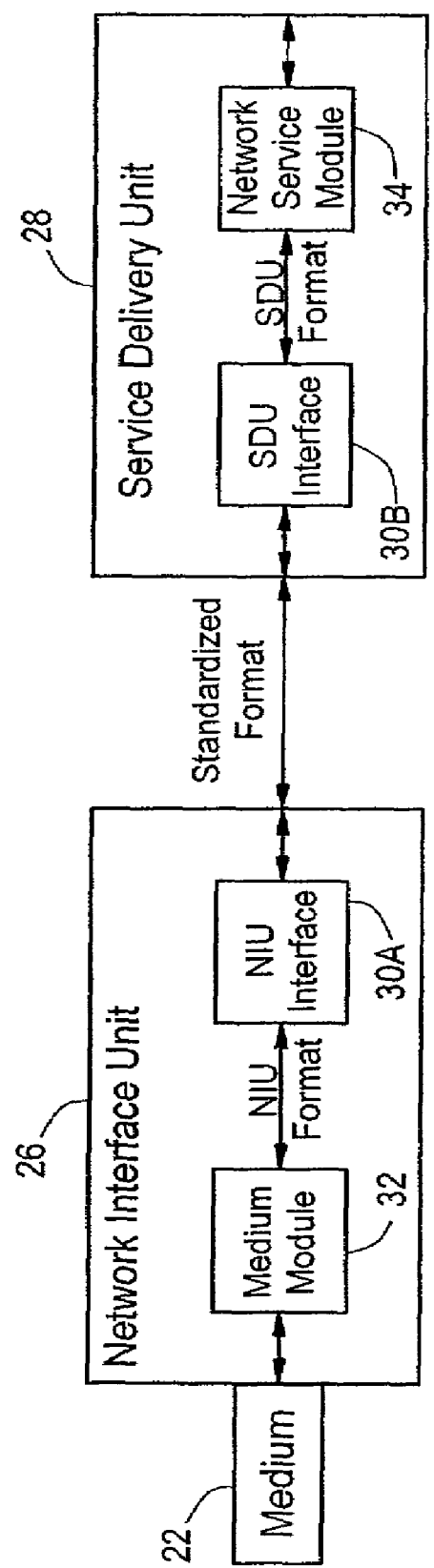
FIG. 5 schematically shows the modular network access system shown in FIG. 2 in which an interface is dispersed across a network interface unit and a service delivery unit.

FIGS. 3–5 schematically show several different types of interfaces 30 that may be used to convert messages forwarded between the network interface unit 26 and the service delivery unit 28. In all such figures, messages are schematically shown between the interface 30 and medium module 32 as being in a format that is specific to the medium module 32 and/or the network interface unit 26. This format is referred to herein as being "N.I.U. format." Conversely, messages between the interface 30 and the network service module 34 are in a format that is specific to the network service module 34 and/or the service delivery unit 28. This format is referred to herein as being "S.D.U. format."

FIG. 3 schematically shows the interface 30 being entirely within the network interface unit 26. In such case, such network interface unit 26 transmits messages to the accompanying service delivery unit 28 in a format that the service delivery unit 28 can interpret (i.e., the S.D.U. format). In a similar manner, such network interface unit 26 can convert messages received from the service delivery unit 28 (i.e., messages in the S.D.U. format) into the N.I.U. format for processing by the medium module 32 and other components within the network interface unit 26.

FIG. 4 schematically shows the interface 30 being entirely within the service delivery unit 28. In such case, such service delivery unit 28 transmits messages to the accompanying network interface unit 26 in a format that the network interface unit 26 can interpret (i.e., in the N.I.U. format). In a similar manner, such service delivery unit 28 can convert messages received from the network interface unit 26 (i.e., messages received in the N.I.U. format) into the S.D.U. format for processing by the network service module 34 and other components within the service delivery unit 28.

For the interfaces 30 in FIGS. 3 and 4 to be operate properly, they must be preprogrammed to convert from specific, predetermined formats of the accompanying network interface units 26 and service delivery units 28. More particularly, the interface 30 must be preprogrammed to be usable with one or more different format types of network interface units 26 and service delivery units 28. For example, the interface 30 in FIG. 3 may be preprogrammed to convert messages to/from a network interface unit 26 for a cable network, and messages to/from a service delivery units 28 providing telephone services.

Accordingly, such network interface unit 26 can couple with any service delivery units 28 providing telephone services. Conversely, if such network interface unit 26 is coupled with a service delivery unit 28 for providing data services, then the interface 30 will not properly convert messages and thus, the access system 18 will not properly operate as a DCE.

To overcome this potential problem shown by example, some embodiments of the interface 30 are configured to be compatible with more than one type of network interface unit 26 and/or service delivery unit. For example, the above exemplary interface 30 of FIG. 3 also may be configured to understand and convert messages for service delivery units 28 that provide any one or more of data services and video services. In a similar manner, the interface 30 of FIG. 4 also may be configured to understand and convert messages for coupled network interface units 26 that are used with any one or more of fiber optic networks, DSL networks, and various types of wireless networks.

In some embodiments, a single network interface unit 26 can be configured to couple with more than one network type 22. In a similar manner, a single service delivery units 28 can be configured to provide more than one network service. In such case, the interface 30 may be preprogrammed to convert messages from multiple network types 22 to one or more specified network service.

FIG. 5 schematically shows an access system 18 in which the interface 30 is distributed between the network interface unit 26 and the service delivery unit 28. Such system utilizes a standardized format to communicate between coupled network interface units 26 and service delivery units 28. This format preferably is identical for all types of network interface units 26 and all types of service delivery units 28. Accordingly, any type of network interface unit 26 can communicate with any type of service delivery unit, thus eliminating the limitations to the embodiments discussed above with regard to FIGS. 4 and 5.

To that end, the network interface unit 26 includes an N.I.U. interface 30A that cooperates with an S.D.U. interface 30B to convert messages to appropriate formats. The N.I.U. interface 30A converts messages from the N.I.U.

format to the standardized format, and from the standardized format to the N.I.U. format. Accordingly, in a manner similar to the interfaces 30 shown in FIGS. 3 and 4, the N.I.U. interface 30A is preconfigured to operate with the particular network medium/media 22 to which the network interface unit 26 is connected.

Conversely, the S.D.U. interface 30B converts messages from the S.D.U. format to the standardized format, and from the standardized format to the S.D.U. format. The S.D.U. interface 30B thus also is preconfigured to operate with the particular network service(s) provided by the network service module 34.

Figure 6:
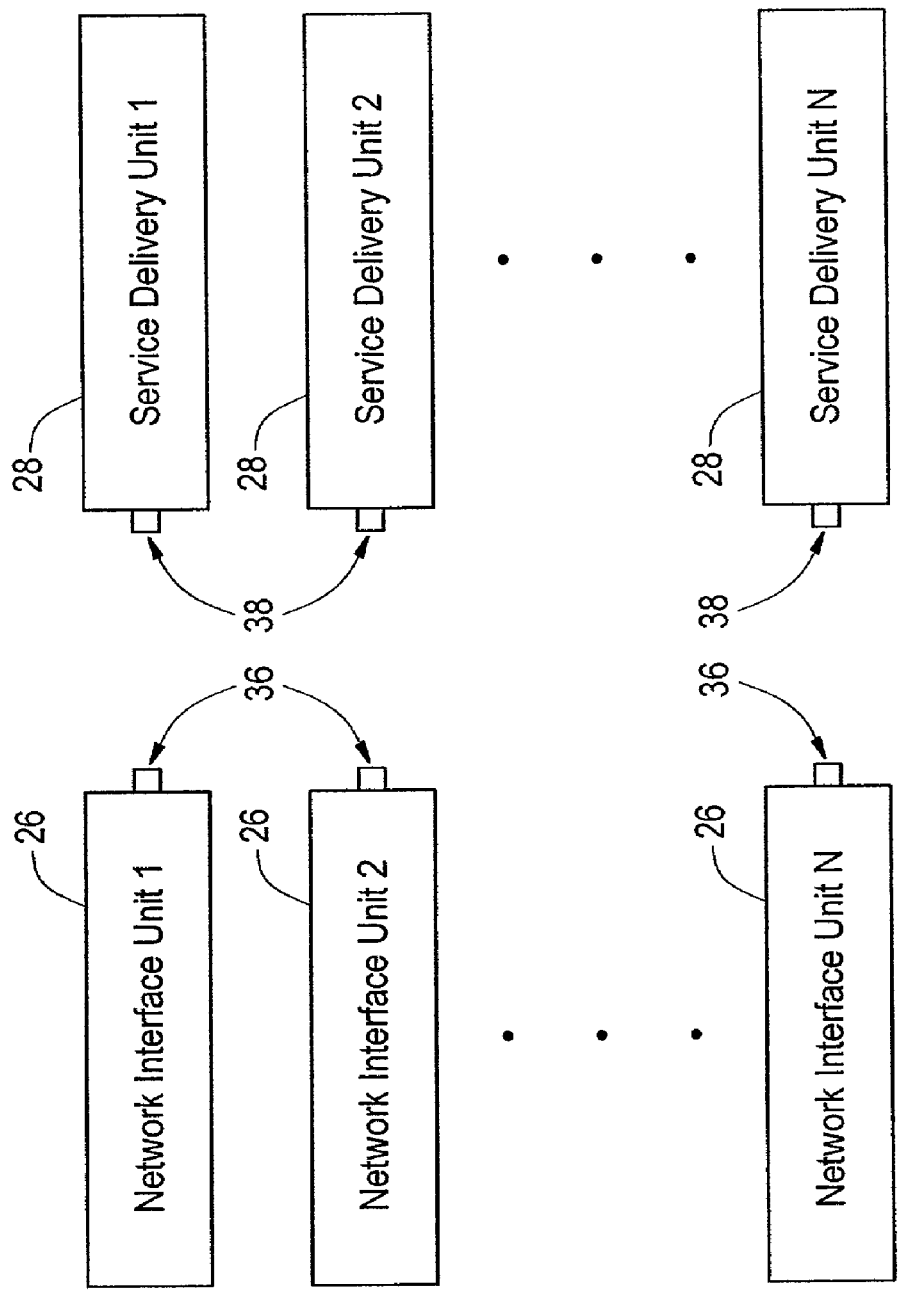
FIG. 6 schematically shows a family of network interface units, a family of service delivery units, and their standard connectors.

In illustrative embodiments, each type of network interface unit 26 has a physical connector 36 that is a standardized size to couple with a corresponding standardized sized mating connector 38 on each type of service delivery unit 28. FIG. 6 schematically shows a family of different types of network interface units 26, and a family of different types of service delivery units 28. Although different, each type of network interface unit 26 has an identical type of connector 36 for connecting with one or more service delivery units 28. In a similar manner, each type of service delivery unit 28 also has an identical type of connector 38 for connecting with one or more network interface units 26.

Figure 7:
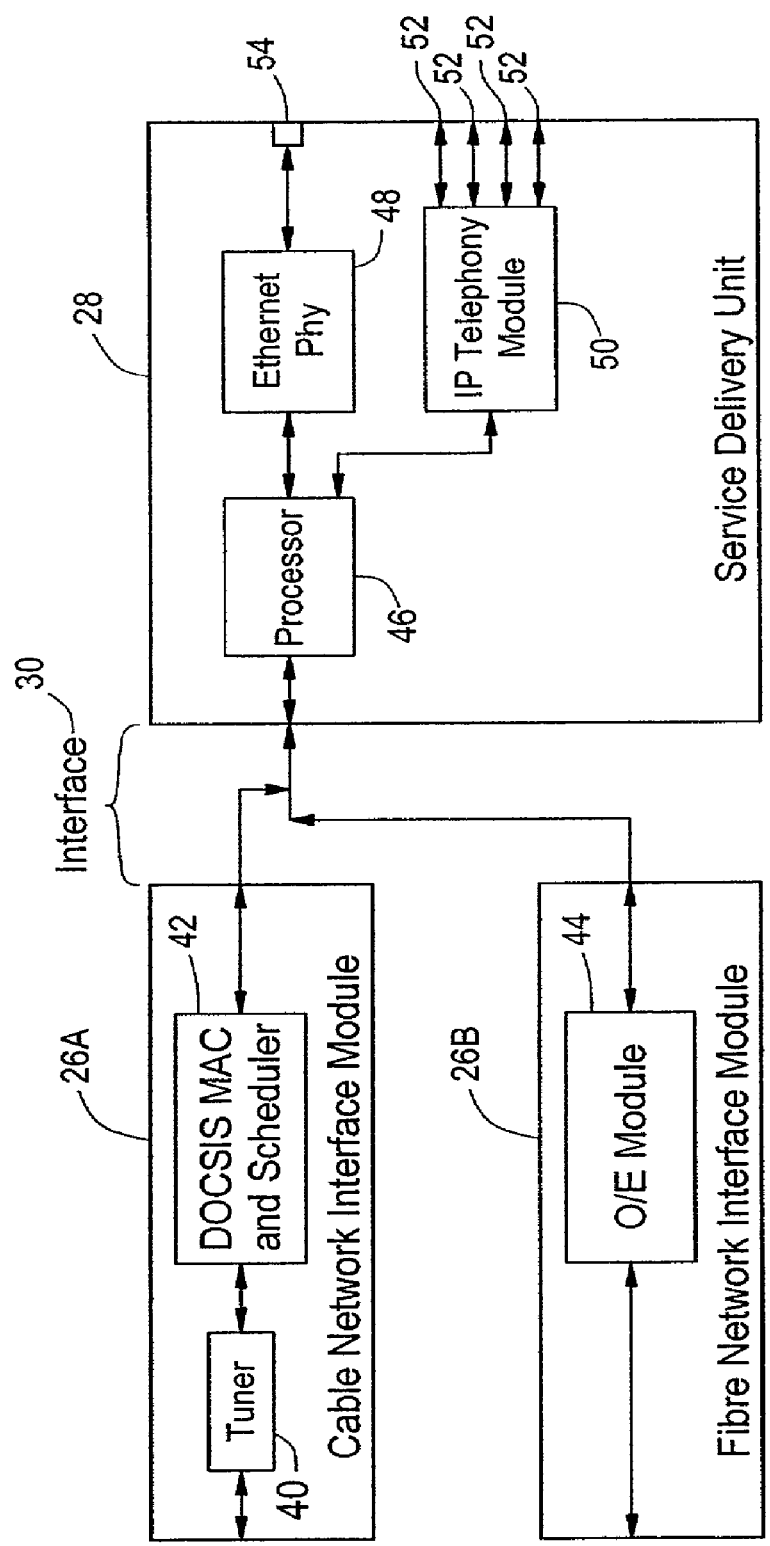
FIG. 7 schematically shows a specific implementation of the network access system shown in FIG. 2.

FIG. 7 schematically shows one embodiment of the access system 18 shown in FIG. 1. This is but one of many different types of access systems 18 that may implement illustrative embodiments of the invention and thus, is not intended to limit the scope of the invention. Accordingly, discussion of this access system 18 is exemplary only. The access system 18 of FIG. 7 includes two modular network interface units 26A and 26B that both couple with a single service delivery unit 28 via a generally shown interface 30. Each network interface unit 26A and 26B includes logic for coupling with one network type 22, while the service delivery unit 28 provides two different types of network services. It should be noted that the interface 30 shown schematically in FIG. 7 can be similar to any one of those shown in FIGS. 3–5. In some embodiments, the interface 30 is a component that is external to both the network interface unit 26A or 26B and the service delivery unit 28.

More particularly, the access system 18 shown in FIG. 7 includes a cable network interface unit 26A for providing a connection to a cable network, and a fiber network interface unit 26B for providing a connection to a fiber optic network. To those ends, the cable network interface unit 26A includes a tuner 40 to provide the physical layer tuning functions, and a DOCSIS MAC and Scheduler 42 that implements DOCSIS standards via the tuner 40. For example, the DOCSIS MAC and Scheduler 42 may coordinate cable transmissions with other transmissions on the cable network, control bandwidth allocations and quality of service, and communicate with a head end device across the cable network. Both the tuner 40 and DOCSIS MAC and Scheduler 42, which function in this embodiment as the medium module 32, may be conventionally available devices.

The fiber network interface unit 26B includes an optical to electrical converter 44 for converting incoming light signals to electrical signals. The converter 44 also includes logic for executing MAC functions on the fiber network to permit multiple different users on a network (i.e., external to the user's premises) to share its use. In illustrative embodiments, the converter 44, which functions as the medium module 32 in this embodiment, includes a conventional PON (passive optical network) diode receiver and laser transmitter, such as a gigabit Ethernet PON microchip.

The service delivery unit 28 includes a processor 46 for executing much of the logic required by the service delivery unit, an Ethernet module 48 for communicating with an Ethernet card on a computer (i.e., thus providing a readily available and simple connection to such computer), and an IP telephony module 50 for providing IP telephony services to one or more IP telephones. The processor 46 and IP telephony module 50 are discussed in greater detail below. In addition, the service delivery unit 28 includes four plugs 52 for coupling the IP telephony module 50 with up to four different IP telephones, and one plug 54 for coupling the Ethernet module 48 with a computer.

The IP telephony module 50 includes logic for communicating with one or more IP telephones, and executing the functions requested by such telephone(s). Among other things, those functions may include distinguishing between the different coupled telephones, directing incoming data to the appropriate telephone, forwarding data from one telephone to an appropriate receiving device (e.g., using an appropriate IP address), signaling processes, and line card functions. Of course, other functions typically executed for such purposes also are implemented in the IP telephony module 50. To these ends, the IP telephony module 50 may include an IP stack, MGCP Signaling, and a line card. For example, these may be implemented, at least in part, by the combination of a digital signal processor ("DSP"), subscriber line access controller ("SLAC"), and a subscriber line interface circuit ("SLIC") that together are preconfigured to execute the necessary functions.

The processor 46 provides overall controlling functionality for the service delivery unit 28, and specific functionality to the Ethernet module 48 and the IP telephony module 50. In particular, the processor 46 may implement and maintain quality of service requirements, which are transmitted to the network interface unit 26 (e.g., a telephone call may require a specific quality of service), resource management within the service delivery unit 28 between the various modules, and media access control ("MAC") functionality for the Ethernet module 48 on behalf of a computer, which may be coupled with a local area network. To implement these and other functions, the processor 46 may be any conventional processor in the art. For example, the processor 46 may be the POWERPC™ 850 Processor, distributed by Motorola, Inc. of Schaumburg, Ill.

As noted above, use of the disclosed system is not limited to the disclosed types of network services and network types 22. Principles of various embodiments thus can be applied to other network types 22 and network services currently available. In fact, such principles are expected to apply to future network types and network services not currently deployed.

Use of the disclosed modular access system 18 thus permits a single network interface unit 26 to cooperate with one or more of many different types of service delivery unit 28 to act as data communication equipment for a coupled network device. In a similar manner, the access system 18 also permits a single service delivery unit 28 to cooperate with one or more of many different types of network interface units 26 for the same purposes. This eliminates the need for a multitude of specialized DCEs that each are specific to both one type of network and one type of network service, thus providing flexibility and saving equipment costs. If properly configured, the disclosed access system 18 should permit any network interface unit 26 to couple with any type of service delivery unit 28.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A network interface unit comprising:
   an interface for connecting a service delivery unit to a given medium, wherein the service delivery unit is any one type in a family of different types of service delivery units, each type of service delivery unit in the family providing a network service that is different than the network service provided by the other types of service delivery units in the family, the service delivery unit processing messages received in a first format;
   a medium module configured to process data for transmission between the given medium and the service delivery unit, the medium module transmitting messages toward the service delivery unit in a second format; and
   an interface module configured to receive messages transmitted between the medium module and the service delivery unit, the interface module being configured to translate messages from the second format to the first format.

2. The network interface unit as defined by claim 1 wherein the service delivery unit transmits messages in the first format, further wherein the medium module processes messages received in the second format, the interface module also being configured for translating messages from the first format to the second format.

3. The network interface unit as defined by claim 1 wherein all of the different types of service delivery units in the family process data in the first format.

4. The network interface unit as defined by claim 1 wherein only the any one type of service delivery unit processes data in the first format, the other service delivery unit types in the family processing data in different formats.

5. The network interface unit as defined by claim 1 wherein the given medium is a broadband medium implementing at least one of a fiber optic technology, cable technology, or digital subscriber line technology.

6. The network interface unit as defined by claim 1 wherein the network service may include at least one of telephony, data service, audio service, video service, and Virtual Private Network service.

7. The network interface unit as defined by claim 1 further including:
   a connector for electrically and physically connecting to the service delivery unit, the connector being a single size that corresponds to the size of connectors on each of the types of service delivery units in the family.

8. The network interface unit as defined by claim 1 wherein the medium module includes a network physical layer and media control module.

9. The network interface unit as defined by claim 1 wherein the network interface unit is physically separated from the service delivery unit.

10. The network interface unit as defined by claim 1 wherein the service delivery unit and network interface unit together are configured for functioning as data communication equipment for data terminal equipment.

11. A service delivery unit for providing a network service, comprising:
    an apparatus cooperating with a network interface unit to function as data communication equipment to a network for data termination equipment, the network interface unit being any one type of a plurality of different types of network interface units, each type of network interface unit having the connection logic for connecting to a network medium that is different than the network mediums to which the other types of network interface units can connect, the network interface unit processing messages received in a first format;
    a network service module that provides the network service, the network service module transmitting messages toward the network interface unit in a second format; and
    an interface module configured for receiving messages transmitted between the network service module and the network interface unit, the interface module being configured to translate messages from the second format to the first format.

12. The service delivery unit as defined by claim 11 wherein the network interface unit transmits messages in the first format, further wherein the network service module processes messages received in the second format, the interface module also being configured to translate messages from the first format to the second format.

13. The service delivery unit as defined by claim 11 wherein all of the types of network interface units process data in the first format.

14. The service delivery unit as defined by claim 11 wherein only the network interface unit processes data in the first format, the other types of network interface units processing data in different formats.

15. The service delivery unit as defined by claim 11 wherein the network mediums each are a broadband medium implementing at least one of a fiber optic technology, cable technology, or digital subscriber line technology.

16. The service delivery unit as defined by claim 11 wherein the network service may include at least one of telephony, data service, audio service, video service, and Virtual Private Network service.

17. The service delivery unit as defined in claim 11 further including:
    a connector for electrically and physically connecting to the network interface unit, the connector being a single size that corresponds to the size of connectors on each of the different types of network interface units.

18. The service delivery unit as defined by claim 11 wherein the network service module includes application specific hardware and software for providing the network service.

19. The service delivery unit as defined in claim 11 wherein the service delivery unit is physically separated from the network interface unit.

20. A modular data communication equipment system comprising:
    a family of different types of network interface units, each type of network interface unit having connection logic for connecting to a network medium that is different than the connection media to which the other types of network interface units can connect;
    a family of different types of service delivery units, each type of service delivery unit providing a network service that is different than the service provided by other types of service delivery units, the network interface units being configured to communicate with at least one service delivery unit via formatted messages; and an interface configured to convert the format of messages transmitted between any one type of the network interface units and any one type of the service delivery units.

21. The system as defined by claim 20 wherein the interface is distributed across the network interface units and the service delivery units.

22. The system as defined by claim 20 wherein the interface is configured to receive messages that are specific to one of any type of service delivery unit, the interface also being configured to convert the format of the received messages to a format that is specific to one of any type of network interface unit.

23. The system as defined by claim 20 wherein the network medium is a broadband medium implementing at least one of fiber optic technology, cable technology, or digital subscriber line technology.

24. The system as defined by claim 20 wherein the network service may include at least one of telephony, data service, audio service, video service, and Virtual Private Network service.

25. The system as defined by claim 20 wherein each type of network interface unit includes a first connector for electrically and physically connecting to one service delivery unit.

26. The system as defined by claim 25 wherein each type of service delivery unit includes a second connector for electrically and physically connecting to the first connector, the first connector being a single size that corresponds to the size of the second connector.

27. The system as defined by claim 20 wherein each network interface unit is physically separated from each service delivery unit.

* * * * *